(12) United States Patent
Ohtomo et al.

(10) Patent No.: US 7,165,875 B2
(45) Date of Patent: Jan. 23, 2007

(54) DISPLAY DEVICE

(75) Inventors: Atsushi Ohtomo, Katsushika (JP);
Masahiro Katou, Mobara (JP)

(73) Assignees: Hitachi Displays, Ltd., Chiba-ken (JP);
Hitachi Display Technologies, Ltd.,
Chiba-ken (JP)

( * ) Notice: Subject to any disclaimer, the term of this patent is extended or adjusted under 35 U.S.C. 154(b) by 35 days.

(21) Appl. No.: 10/894,014

(22) Filed: Jul. 20, 2004

(65) Prior Publication Data

US 2005/0036335 A1 Feb. 17, 2005

(30) Foreign Application Priority Data

Jul. 23, 2003 (JP) .............................. 2003-278394

(51) Int. Cl.
*F21V 7/04* (2006.01)
(52) U.S. Cl. ........................................ 362/632; 349/58
(58) Field of Classification Search ............... 362/632, 362/633, 634
See application file for complete search history.

(56) References Cited

U.S. PATENT DOCUMENTS

| 5,966,191 | A | * | 10/1999 | Lee | .............................. | 349/58 |
| 5,988,827 | A | * | 11/1999 | Lee | .............................. | 362/633 |
| 6,046,785 | A | * | 4/2000 | Won | ............................. | 349/58 |
| 6,507,377 | B1 | * | 1/2003 | Jung | ............................ | 349/60 |
| 6,561,664 | B1 | * | 5/2003 | Yachi et al. | ................. | 362/615 |
| 6,828,721 | B1 | * | 12/2004 | Wakita | ........................ | 313/491 |
| 2004/0008512 | A1 | * | 1/2004 | Kim | ............................ | 362/235 |

FOREIGN PATENT DOCUMENTS

JP 07-261173 3/1994

* cited by examiner

*Primary Examiner*—Ali Alavi
*Assistant Examiner*—Hargobind S. Sawhney
(74) *Attorney, Agent, or Firm*—Reed Smith LLP; Stanley P. Fisher, Esq.; Juan Carlos A. Marquez, Esq.

(57) ABSTRACT

The present invention prevents a defective display attributed to a non-uniform gap between a display element and a backlight which is caused by a phenomenon that an inner wall of a mold casing is shaved off by an end periphery of the display element and a shaved-off debris remains between the casing and the display element. Guide projections are integrally formed on an inner wall of a picture-frame-like portion of the mold casing and, at the same time, a gap which accommodates the shaved-off debris is formed between the guide projection and a bottom portion of the mold casing.

16 Claims, 8 Drawing Sheets

DISPLAY DEVICE

BACKGROUND OF THE INVENTION

1. Field of the Invention

The present invention relates to a panel-type display device, and more particularly, the present invention is preferably applicable to a display device in which a frame-like casing which is made of a material softer than a material of substrates which constitute a display element is provided and the display element is integrally housed and held in the casing, for example, a miniaturized display element having the small assembling tolerance of a display element and a casing such as a liquid crystal display device mounted on a mobile phone or the like or an organic light emitting display device.

2. Description of the Related Art

With respect to the assembling of plate-like members which constitute a panel-type display device and a casing which houses the plate-like members, there has been known a panel-type display device which is disclosed in Japanese Patent Laid-open Hei7 (1995)-261173 (literature 1). In this literature 1, there is disclosed the panel-type display device in which a light guide plate is housed in a mold casing which is a molded product made of a resin material and a liquid crystal display element is overlapped to the light guide plate. In the literature 1, the panel-type display device uses a picture-frame-like portion which opens at a front surface side on which the display element is overlapped and surrounds a periphery of the display device, and a frame-like mold casing which has a bottomed portion which is integrally formed with the picture-frame-like portion on a back surface opposite to the front surface side on which the display element of the casing is overlapped are used, wherein a stopper is formed in an inner wall of one side of the mold casing and light guide plates are housed in inner walls of other three sides which conform to the shape of the light guide plates. However, there is no description with respect to the relationship between the display element which is overlapped to the light guide plate and the mold casing.

BRIEF SUMMARY OF THE INVENTION

In the description of the related art, since the light guide plate which is a plate-like member housed in the casing (hereinafter referred to as "mold casing") is a molded product made of acrylic resin, there is substantially no possibility that there arises a drawback that a periphery of the light guide plate shaves off the mold casing when the periphery of the light guide plate abrades the inner wall of the mold casing in a step for housing the light guide plate in the mold casing. However, with respect to the display device which is configured such that in the mold casing which houses the light guide plate, the display element which adopts the glass substrate as a constitutional element thereof is housed, there exists the possibility that when the display element is housed in the mold casing, a periphery of the substrate which constitutes the display element shaves off the mold casing side by abrading the inner wall of the mold casing and shaved-off debris remains between the mold casing and the substrate thus lowering the assembling accuracy of the display element.

In a display device which adopts a method in which a periphery of a back surface of a display element to be housed is fixed to a mold casing using a pressure sensitive double coated tape (hereinafter referred to as a double coated tape), the above-mentioned shaved-off debris adheres to an upper surface of the double coated tape thus lowering the assembling accuracy of the display element and, at the same time, the adhesive property is lowered so that the display element is floated from the mold casing whereby the distance between the backlight which is constituted of the light guide plate arranged at a back surface of the mold casing becomes non-uniform in plane thus giving rise to display irregularities. This has been a task to be solved by the present invention. Particularly, the solution of this task is crucial in assembling a miniaturized display device having small assembling tolerance.

FIG. 10A and FIG. 10B are explanatory views for explaining the task of the related art of the present invention, wherein FIG. 10A is a cross-sectional view and FIG. 10B is an enlarged view of a portion J shown in FIG. 10A. FIG. 10A and FIG. 10B show a display device which uses a liquid crystal display element as a display element. A mold casing is a molded product made of a resin material and is constituted of a picture-frame-like portion MDA which opens in a front surface side for allowing the insertion of a liquid crystal display element LCD and surrounds a periphery of the liquid crystal display element LCD, and a bottom portion MDB which is integrally formed with the picture-frame-like portion MDA of the mold casing on a back surface opposite to the front surface side through which the liquid crystal display element LCD is inserted.

A substrate of the liquid crystal display element LCD is formed of a glass plate which is harder than a material of the mold casing. That is, the mold casing is softer than the substrate of the liquid crystal display element LCD. In the mold casing, a recessed portion which houses a backlight formed of a light guide plate GLB and an optical compensation sheet (a prism sheet or a diffusion sheet) and a portion which houses the liquid crystal display element LCD above the backlight in an overlapped manner are formed. Here, a light source (light emitting diodes or the like) (not shown) is arranged to face a side end of the light guide plate GLB.

In the liquid crystal display element LCD, a liquid crystal layer is sealed between two glass substrates, wherein electrodes and thin film transistors for forming pixels are formed on either one or both of the glass substrates, and polarizers POL1, POL2 are laminated to a back surface and a front surface of the glass substrates respectively. Further, on one end periphery of the liquid crystal display element LCD, a flexible printed circuit board FPC for inputting signals and voltages for display from an external signal source is mounted.

The mold casing houses the backlight therein and inserts and fixes the liquid crystal display element LCD above the backlight. A double coated tape BTP is usually used for such fixing. In mounting the liquid crystal display element LCD in the mold casing, the end periphery of the liquid crystal display element LCD which is formed of the hard material (the glass plate) abrades and shaves off an inner wall of the picture-frame-like portion MDA of the mold casing made of a soft material and the shaved-off debris DB remains on the double coated tape BTP. As a result, the liquid crystal display element LCD and the double coated tape BTP are not firmly adhered to each other and hence, the sufficient fixing is not obtained and, at the same time, the distance between the liquid crystal display element LCD and the backlight becomes non-uniform thus giving rise to a defective display such as brightness irregularities. Here, even when the liquid crystal display element LCD does not use the double coated tape, due to the presence of the shaved-off debris DB between the display element and the mounting surface, the gap between the display element and the backlight becomes non-uniform. This is particularly apparent in the assembling step of a miniaturized display device which is used in a mobile phone or the like and has been one of tasks to be solved.

This task can be solved by integrally forming guide projections on an inner wall of a mold casing and, further, by forming a gap between the guide projection and a bottom portion of the mold casing. Further, the task can be overcome by forming an opening which leads from a space between the guide projection and the bottom portion of the above-mentioned mold casing to the outside of the mold casing in place of the gap. Still further, the task can be overcome by forming a recess in the vicinity of the above-mentioned gap.

According to one aspect of the present invention, in an assembling step in which a display element is housed in the inside of a mold casing, all of or most of shaved-off debris which is shaved off due to an abrasion between a periphery of the display element which is formed of a material harder than a material of the mold casing and the guide projection formed on the mold casing is accommodated in the gap. As a result, the debris which remains between the display element and the mold casing (particularly between the display element and the double coated tape when the double coated tape is arranged close to a picture frame portion, hereinafter the arrangement being understood in this context) is completely eliminated or drastically reduced whereby the display element can be accurately positioned relative to the mold casing and also can be accurately mounted on the mold casing.

Further, in the assembling step in which the display element is housed in the inside of the mold casing, all of or most of shaved-off debris which is shaved off due to the abrasion between the periphery of the display element which is formed of the material harder than the material of the mold casing and the guide projection formed on the mold casing is accommodated in the above-mentioned opening and is also discharged to the outside of the mold casing. As a result, the debris which remains between the display element and the mold casing is completely eliminated or is drastically reduced whereby the display element can be accurately positioned relative to the mold casing and also can be accurately mounted on the mold casing.

Further, in the assembling step in which the display element is housed in the inside of the mold casing, all of or most of shaved-off debris which is shaved off due to the abrasion between the periphery of the display element which is formed of the material harder than the material of the mold casing and the guide projection formed on the mold casing is accommodated in the above-mentioned recess. As a result, the debris which remains between the display element and the mold casing is completely eliminated or is drastically reduced whereby the display element can be accurately positioned relative to the mold casing and also can be accurately mounted on the mold casing.

According to another aspect of the present invention, in a display device which integrally inserts, houses and holds a panel type display element in a frame-like casing made of a material softer than a material of substrates which constitute the panel-type display element, the casing includes a picture-frame-like portion which forms an opening in a front surface side thereof for inserting the display element therein and surrounds a periphery of the display element, and a bottom portion which is integrally formed with the picture-frame-like portion at at least a portion of a back surface of the casing opposite to the front surface side for inserting the display element, a guide projection which extends in the bottom portion direction from the front surface side to guide the insertion of the display element is formed on an inner wall of a side of the picture-frame-like portion which is brought into contact with an outer periphery of the substrate which constitutes the display element, and an opening is formed in the vicinity of an end portion of the guide projection of the picture-frame-like portion of the casing at the bottom portions side in a state that the opening penetrates the casing so as to communicate with the outside of the casing for enabling the discharge of the above-mentioned shaved-off debris.

According to still another aspect of the present invention, in a display device which integrally inserts, houses and holds a panel type display element in a frame-like casing made of a material softer than a material of substrates which constitutes the display element, the casing includes a picture-frame-like portion which forms an opening in a front surface side thereof for inserting the display element therein and surrounds a periphery of the display element, and a bottom portion which is integrally formed with the picture-frame-like portion at at least a portion of a back surface of the casing opposite to the front surface side for inserting the display element, a guide projection which extends in the bottom portion direction from the front surface side to guide the insertion of the display element is formed on an inner wall of a side of the picture-frame-like portion which is brought into contact with an outer periphery of the substrate which constitutes the display element, and a recess is formed in the vicinity of an end portion of the guide projection of the picture-frame-like portion of the casing at the bottom portions side in a state that the recess is formed in the inside of the casing for enabling the accommodation of the above-mentioned shaved-off debris.

Due to these inventions, it is possible to obviate a defective display such as brightness irregularities attributed to the floating of the display device from the mold casing whereby the high-quality display device can be realized.

Further, with respect to the display device which fixes the display element to the mold casing using a double coated tape, it is possible to prevent the lowering of the adhesive property attributed to the presence of the shaved-off debris between the double coated tape and the display element whereby the floating of the display element from the mold casing can be prevented and, at the same time, a given fixing force can be obtained.

DESCRIPTION OF THE PREFERRED EMBODIMENTS

Figure 1A:
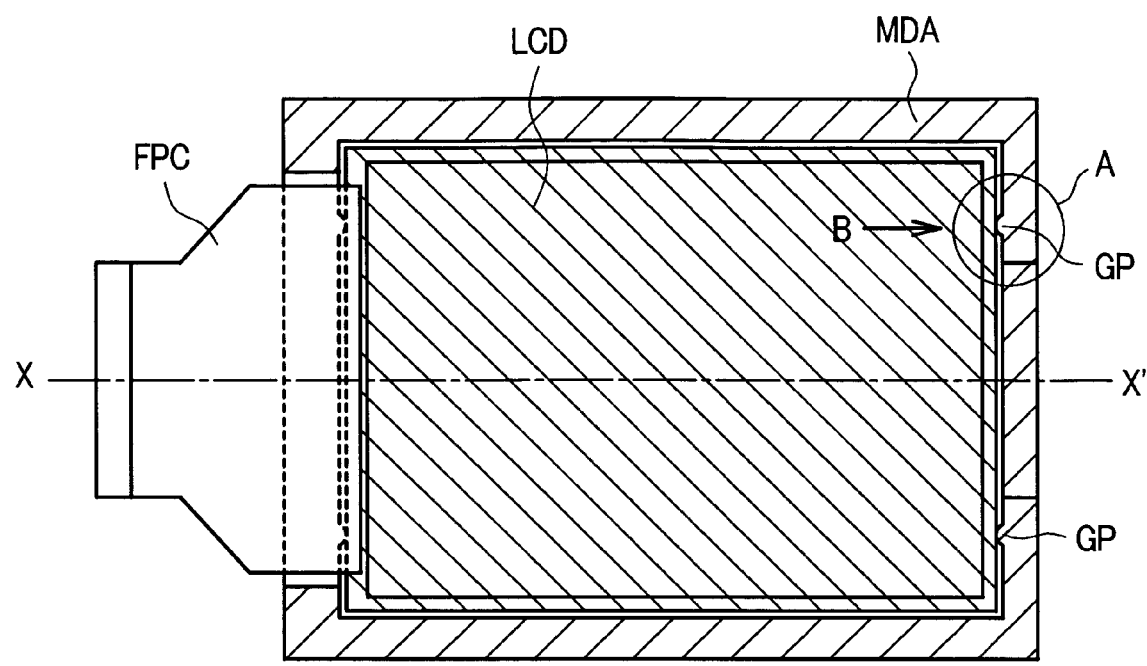
FIG. 1A and FIG. 1B are schematic views for explaining the constitution of a display device.
Figure 1B:
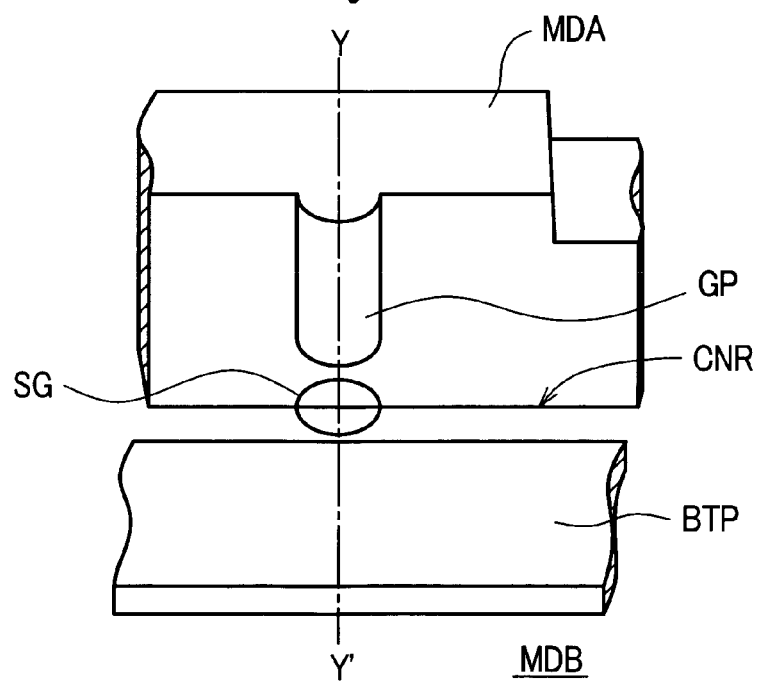

FIG. 1A and FIG. 1B are schematic views for explaining the constitution of a display device according to an embodiment 1, wherein FIG. 1A is a plan view of the display device and FIG. 1B is a perspective view of an essential part showing a portion A in FIG. 1A in the direction B from an oblique upper position. Further, FIG. 2 a cross-sectional view of an essential part taken along a line Y–Y' in FIG. 1B.

Figure 2:
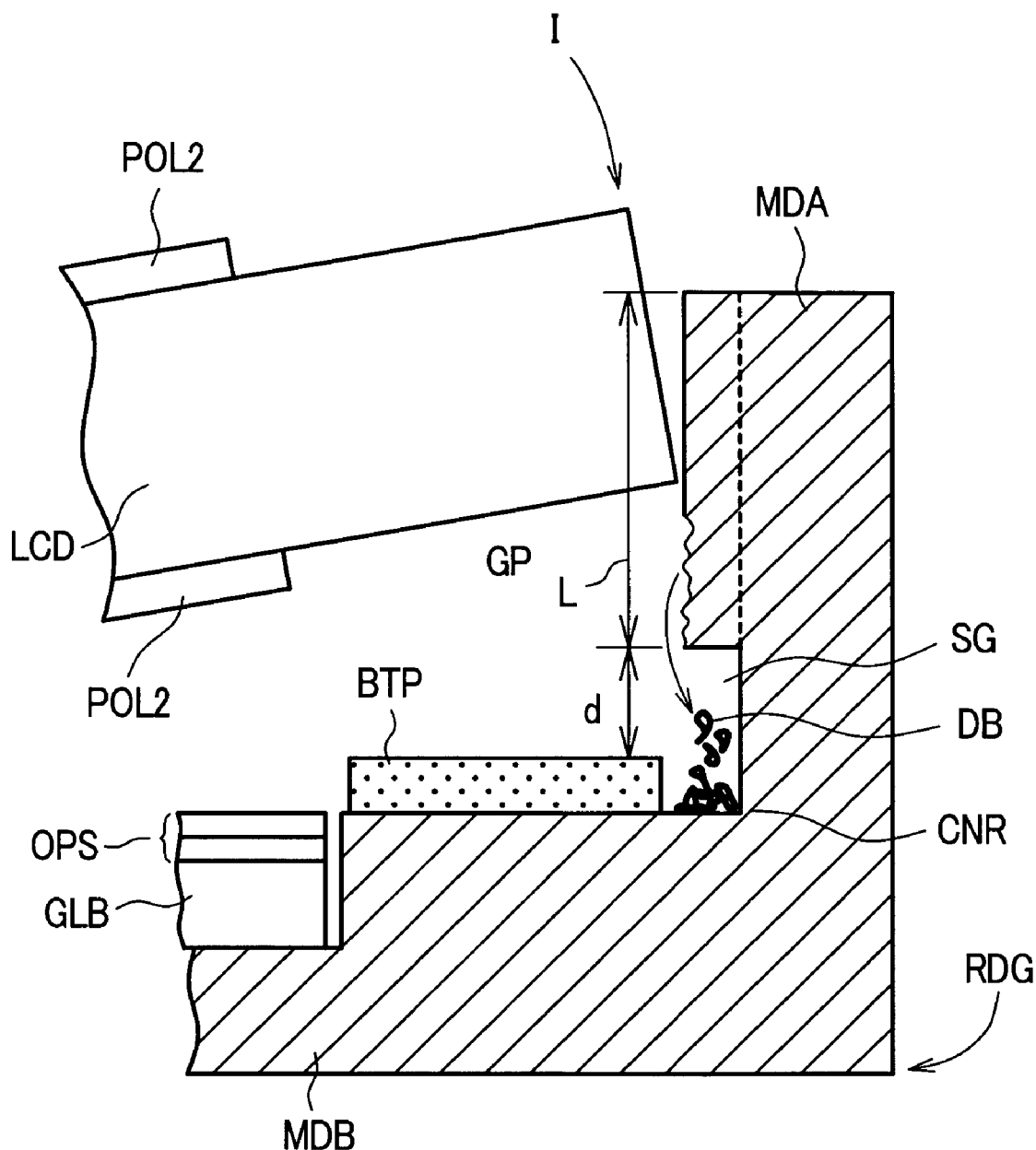
FIG. 2 is a cross-sectional view of an essential part taken along a line Y–Y' in FIG. 1B.

The display device which is explained in conjunction with FIG. 1A, FIG. 1B and FIG. 2 is a liquid crystal display device using a liquid crystal display element as a display element. The liquid crystal display device is constituted by housing a light guide plate, an optical compensation sheet (a diffusion sheet, a prism sheet) OPS and the liquid crystal display element LCD in a casing which is a molded product made of a resin material (a mold casing) in a stacked manner. The mold casing is constituted of a picture-frame-like portion MDA which opens in a front surface side for allowing the insertion of the liquid crystal display element LCD and surrounds a periphery of the liquid crystal display element LCD, and a bottom portion MDB which is integrally formed with the picture-frame-like portion MDA of the mold casing on a back surface opposite to the front surface side through which the display element LCD is inserted.

In FIG. 1A, the liquid crystal display element LCD which is housed in the mold casing seals liquid crystal between two glass substrates and polarizers POL1, POL2 are respectively laminated to a back surface and a front surface of the substrate. Further, a flexible printed circuit board FPC to which signals and voltages for display are supplied from an external signal source is connected to one side of the substrate. Here, the liquid crystal display element LCD which is constituted of two glass substrates is illustrated as one plate in the drawing. In this embodiment, a pair of guide projections GP are formed on inner walls of two sides which face each other in an opposed manner in the X–X' direction of the picture-frame-like portion MDA of the mold casing.

The guide projections GP formed on the inner walls of the picture-frame-like portion MDA of the mold casing have an approximately semi-circular cross section and have the longitudinal direction thereof arranged parallel to the Y–Y' direction. However, a shape of the guide projections GP is not limited to such a shape and may be other shape (a shape having a rectangular or triangular cross section, a simple bulging shape or the like) which projects from the surface of the inner wall of the picture-frame-like portion MDA toward the inside. Further, a lower end of the guide projection GP, that is, an end portion of the guide projection GP at a bottom portion MDB side terminates at a position remote from a surface of the bottom portion MDB thus forming a gap SG between the guide projection GB and the bottom portion MDB. The gap SG includes a boundary CNR between the picture-frame-like portion MDA and the bottom portion MDB.

In this embodiment, a double coated tape BTP is provided at a position retracted from the boundary CNR for fixing the liquid crystal display element LCD. Here, the bottom portion MDB is provided with a stepped portion of a recessed portion for housing a light guide plate GLB and an optical sheet OPS (a diffusion sheet, a prism sheet) which constitute a backlight at a bottom portion MDB opposite to the boundary CNR of the double coated tape BTP.

In FIG. 2, assuming a length of the guide projection GP as L, the above-mentioned gap SG is formed between the guide projection GP and the bottom portion MDB such that a distance d (d<L) is defined between the lower end of the guide projection GP and the bottom portion MDB of the mold casing. Here, symbol RDG indicates an outer boundary defined between the picture-frame-like portion MDA and the bottom portion MDB of the mold casing.

Here, in this embodiment, although the guide projections GP and the gaps SD are respectively formed on two opposing sides of the mold casing in the X–X' direction, there may be a case that only the guide projections GP are formed on the inner wall at the flexible-printed-circuit-board-FPC side or neither the guide projections GP nor the gaps SD are formed on the inner wall at the flexible-printed-circuit-board-FPC side. When only the guide projections GP are formed on the inner wall at the flexible-printed-circuit-board-FPC side, the mold casing may adopt a shape having no such gaps. Inner walls of the mold casing at sides perpendicular to the X–X' direction have allowance which brings the liquid crystal display element LCD into close contact with the inner walls and hence, a double coated tape is not provided to such a portion.

According to the constitution described in this embodiment, in housing the liquid crystal display element LCD in the mold casing, first of all, the liquid crystal display element LCD is inserted into the mold casing such that the flexible-printed-circuit-board-FPC side thereof shown in FIG. 1A is brought into contact with one inner wall of the picture-frame-like portion MDA of the mold casing. Thereafter, the liquid crystal display element LCD is pushed into the picture-frame-like portion MDA of the mold casing by pushing the liquid crystal display element LCD such that the liquid crystal display element LCD is rotated in the direction I in FIG. 2. In such an operation, an end periphery of the substrate of the liquid crystal display element LCD abrades the guide projection GP and shaves off a portion of the guide projection GP. All of or most of the shaved-off debris DB is accommodated in the gap SG and no shaved-off debris or substantially no debris is stacked on the double coated tape BTP. Accordingly, the liquid crystal display element LCD is firmly adhered to the double coated tape BTP and hence, the distance defined between the liquid crystal display element LCD and the backlight which is constituted of the light guide plate GLB and the optical sheet OPS becomes uniform in plane whereby the occurrence of the defective display such as the brightness irregularities can be prevented and the high-quality image can be obtained.

Figure 3A:
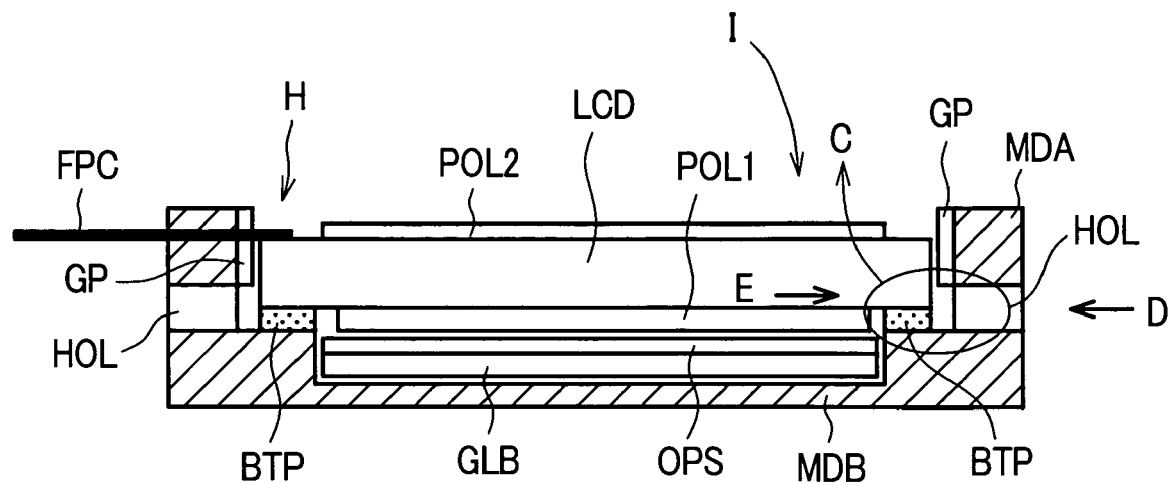
FIG. 3A and FIG. 3B are explanatory views of the display device.
Figure 3B:
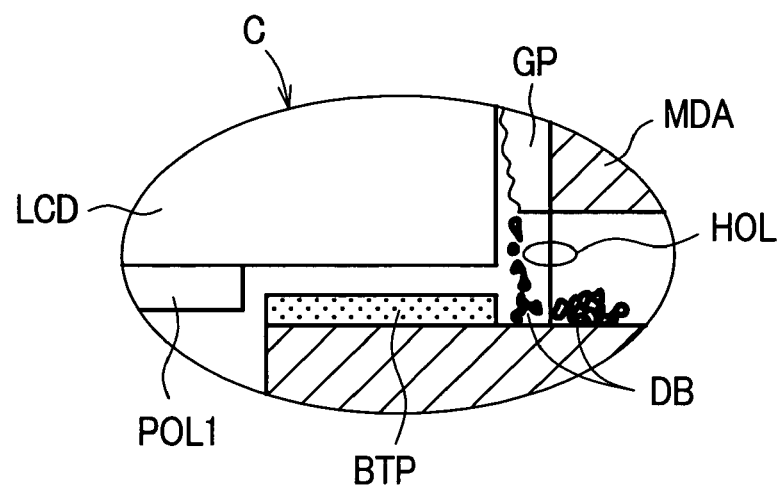
Figure 4:
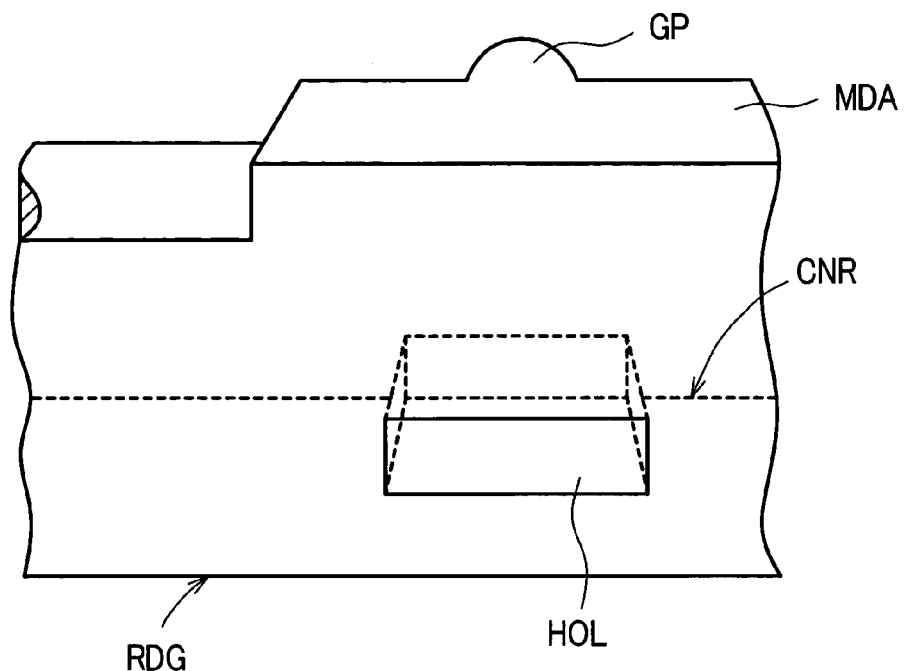
FIG. 4 is a side view of an essential part showing a portion C in FIG. 3A in the direction D from an oblique upper portion.
Figure 5:
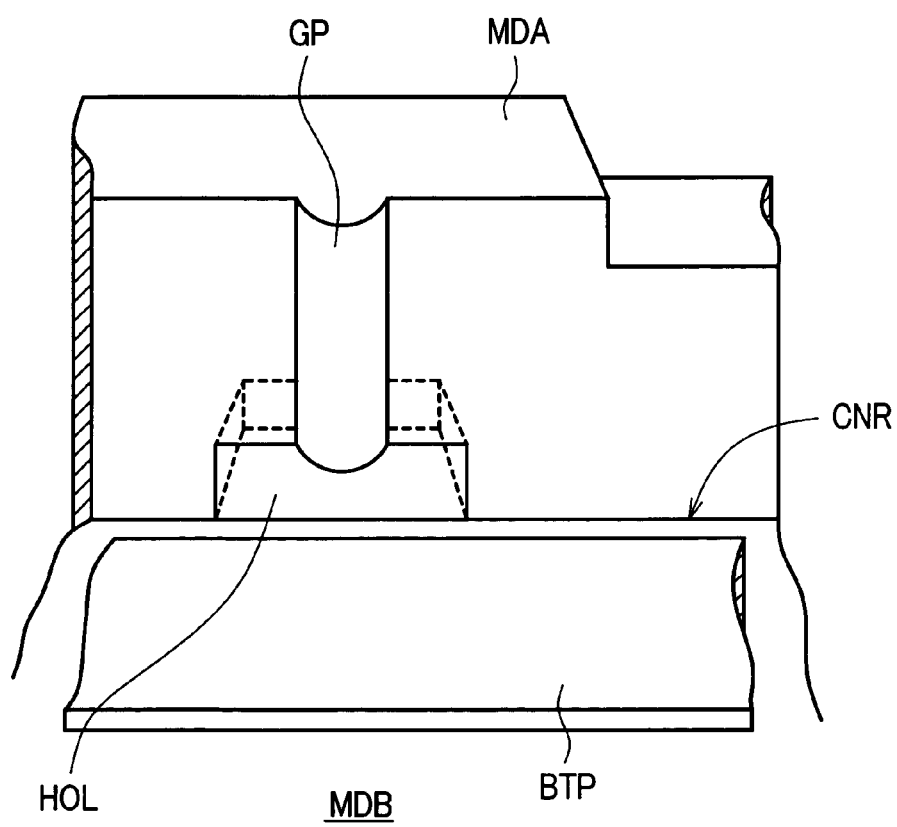
FIG. 5 is an inner side view showing the portion C in FIG. 3A in the direction E from above.

FIG. 3A and FIG. 3B are explanatory views of the display device according to an embodiment 2, wherein FIG. 3A is a cross-sectional view showing a cross section corresponding to the cross section taken along a line X–X' in FIG. 1A and FIG. 3B is a cross-sectional view of an enlarged essential part of a portion C in FIG. 3A. FIG. 4 is a side view of an essential part showing the portion C in FIG. 3A in the direction D from an oblique upper portion. FIG. 5 is an inner side view showing the portion C in FIG. 3A in the direction E from an oblique upper position. As shown in FIG. 3A to FIG. 5, in this embodiment, at a portion corresponding to the gap defined between the guide projection GP and the bottom portion MDB in the embodiment 1, an opening HOL which penetrates the picture-frame-like portion MDA of the mold casing is formed in a state that the opening HOL is communicated with the outside of the mold casing. A shape of the guide projections GP in this embodiment may also have the versatile shapes as described in conjunction with the embodiment 1.

The light guide plate GLB and the optical sheet OPS which are housed in the recessed portion formed in the bottom portion MDB of the mold casing and the liquid crystal display element LCD is housed in the mold casing such that the liquid crystal display element LCD is stacked on the light guide plate GLB and the optical sheet OPS. On a stepped surface formed between the recessed portion of the bottom portion MDB of the mold casing and the picture-frame-like portion MDA, a double coated tape BTP is provided, and a periphery of aback surface of the inserted liquid crystal display element LCD is fixed to the bottom portion MDB of the mold casing. Other constitutions are substantially equal to the constitutions of the embodiment 1.

According to the constitution described in this embodiment, in housing the liquid crystal display element LCD in the mold casing, first of all, as indicated by an arrow H in FIG. 3A, the liquid crystal display element LCD is inserted into the mold casing such that the flexible-printed-circuit-board-FPC side thereof shown in FIG. 3A is brought into contact with one inner wall of the picture-frame-like portion MDA of the mold casing. Thereafter, the liquid crystal display element LCD is pushed into the picture-frame-like portion MDA of the mold casing by pushing the liquid crystal display element LCD such that the liquid crystal display element LCD is rotated in the direction I in FIG. 3. In such an operation, an end periphery of the substrate of the liquid crystal display element LCD abrades the guide projection GP and shaves off a surface portion of the guide projection GP. All of or most of the shaved-off debris DB is accommodated in the opening HOL through the gap SG or the shaved-off debris DB is discharged to the outside of the mold casing from the opening HOL. Accordingly, no debris DB or substantially no debris DB is stacked on the double coated tape BTP. As a result, the liquid crystal display element LCD is firmly adhered to the double coated tape BTP and hence, the gap defined between the liquid crystal display element LCD and the backlight which is constituted of the light guide plate GLB and the optical sheet OPS becomes uniform in plane whereby the occurrence of the defective display such as the brightness irregularities can be prevented and the high-quality image display can be obtained.

Figure 6A:
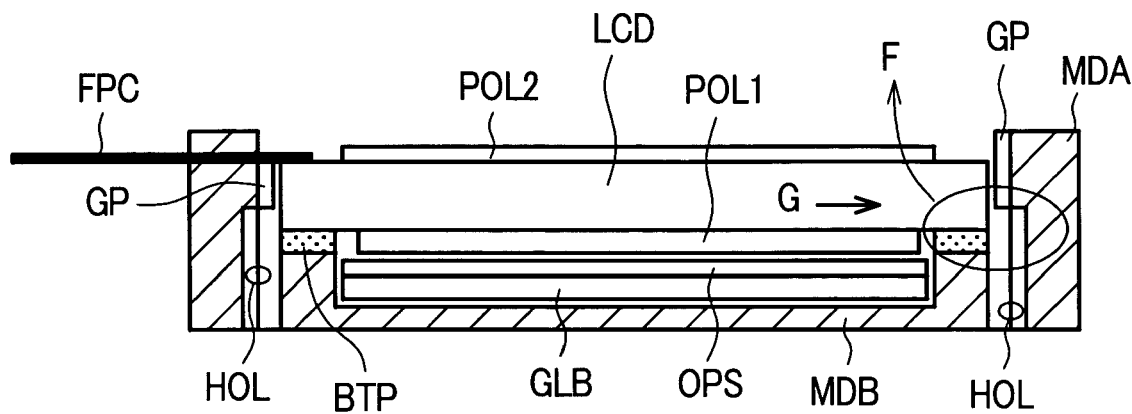
FIG. 6 is an explanatory view of the display device.
Figure 6B:
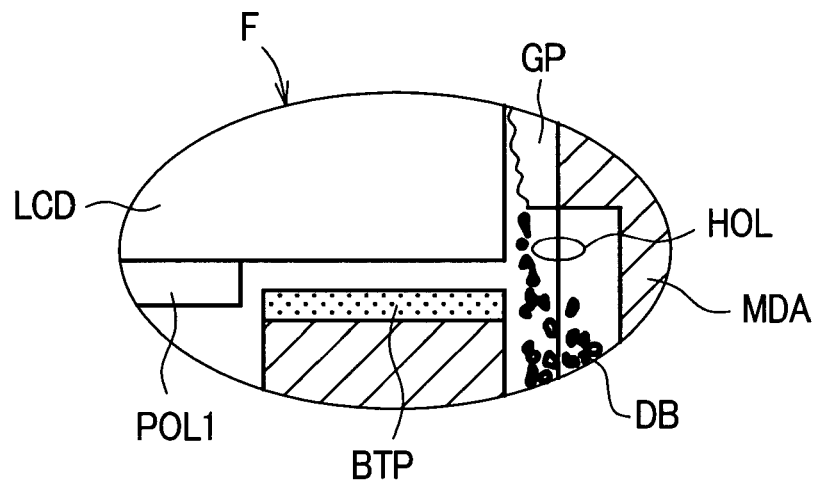
Figure 7:
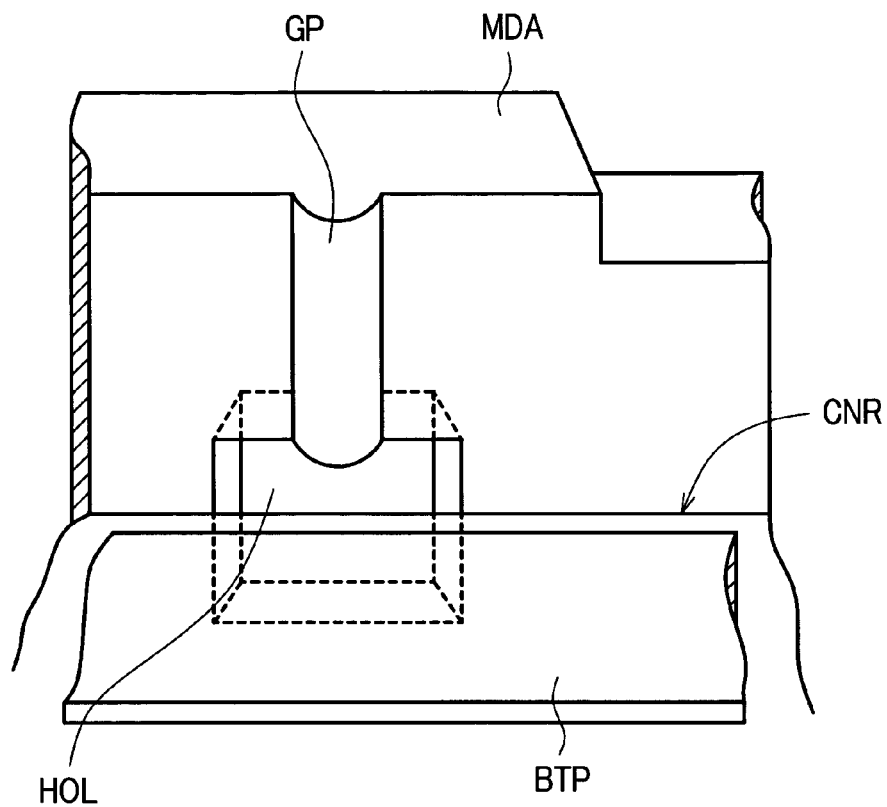
FIG. 7 is a side view of an essential part showing a portion F in FIG. 6A in the direction G from an oblique upper portion.

FIG. 6A and FIG. 6B are explanatory views of the display device according to the embodiment 3, wherein FIG. 6A is a cross-sectional view showing a cross section corresponding to the cross section taken along a line X–X' in FIG. 1A and FIG. 6B is a cross-sectional view of an enlarged essential part of a portion F in FIG. 6A. FIG. 7 is a side view of an essential part showing a portion F in FIG. 6A in the direction G from an oblique upper portion. As shown in FIG. 6A to FIG. 7, in this embodiment, at a portion corresponding to the gap defined between the guide projection GP and the bottom portion MDB in the embodiment 1, an opening HOL which penetrates the bottom portion MDB of the mold casing is formed in a state that the opening HOL communicates with the outside of the mold casing. A shape of the guide projections GP in this embodiment also may have the versatile shapes as described in conjunction with the embodiment 1.

In the same manner as the above-mentioned respective embodiments, the light guide plate GLB and the optical sheet OPS are housed in the recessed portion formed in the bottom portion MDB of the mold casing and the liquid crystal display element LCD is housed in the mold casing. On a stepped surface formed between the recessed portion of the bottom portion MDB of the mold casing and the picture-frame-like portion MDA, a double coated tape BTP is provided, and a periphery of a back surface of the inserted liquid crystal display element LCD is fixed to the bottom portion MDB of the mold casing. Other constitutions are substantially equal to the constitutions of the embodiment 1 and the embodiment 2.

According to the constitution described in this embodiment, in housing the liquid crystal display element LCD in the mold casing, all of or most of the produced shaved-off debris DB is discharged to the outside of the mold casing through the opening HOL from the gap. Accordingly, no debris DB or substantially no debris DB is stacked on the double coated tape BTP. As a result, liquid crystal display element LCD is firmly adhered to the double coated tape BTP and hence, the gap defined between the liquid crystal display element LCD and the backlight which is constituted of the light guide plate GLB and the optical sheet OPS becomes uniform in plane whereby the occurrence of the defective display such as the brightness irregularities can be prevented and the high-quality image display can be obtained.

Figure 8:
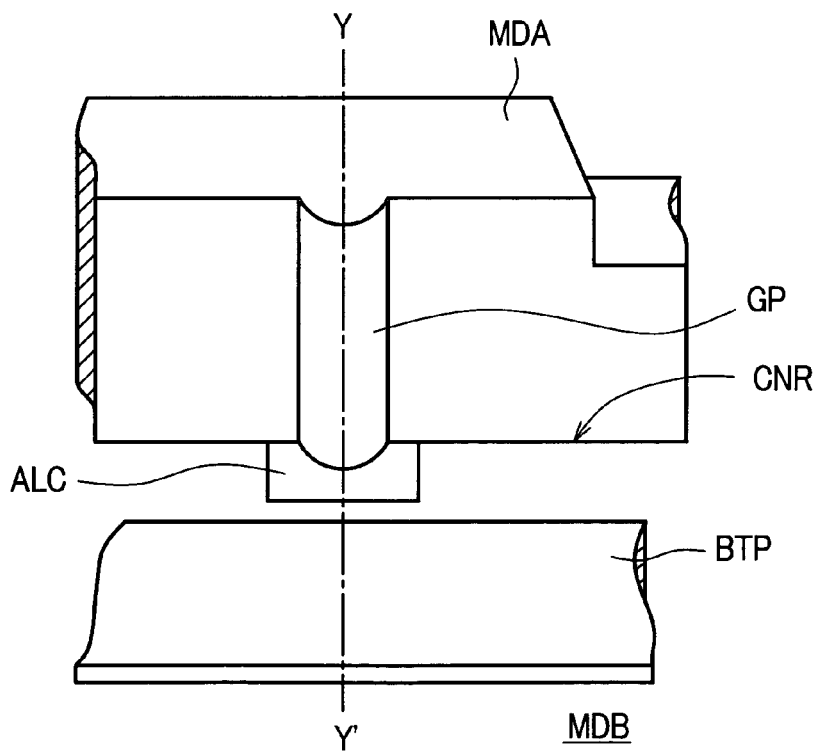
FIG. 8 is a perspective view of an essential part of the display device similar to FIG. 1B.
Figure 9:
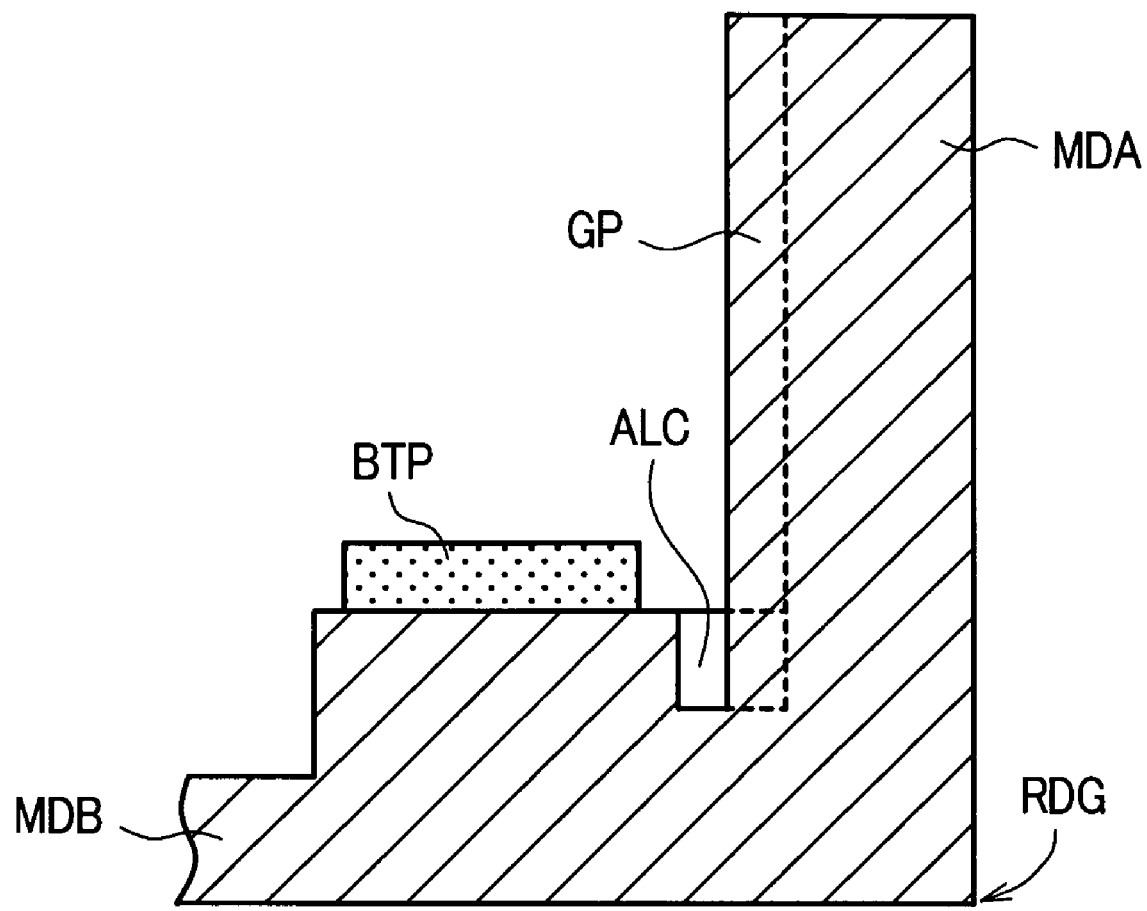
FIG. 9 is a cross-sectional view taken along a line Y–Y' in FIG. 8.
Figure 10A:
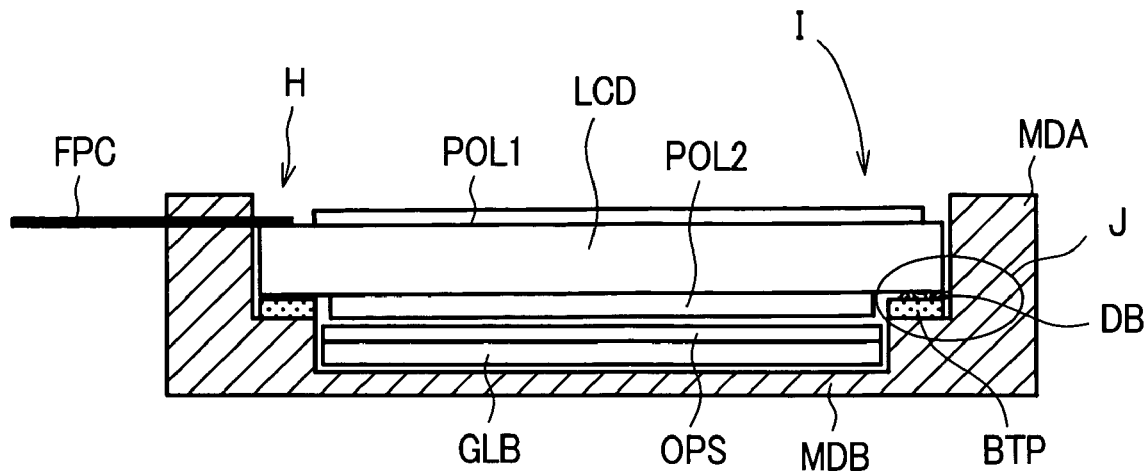
FIG. 10A is a cross-sectional view of a conventional display device.
Figure 10B:
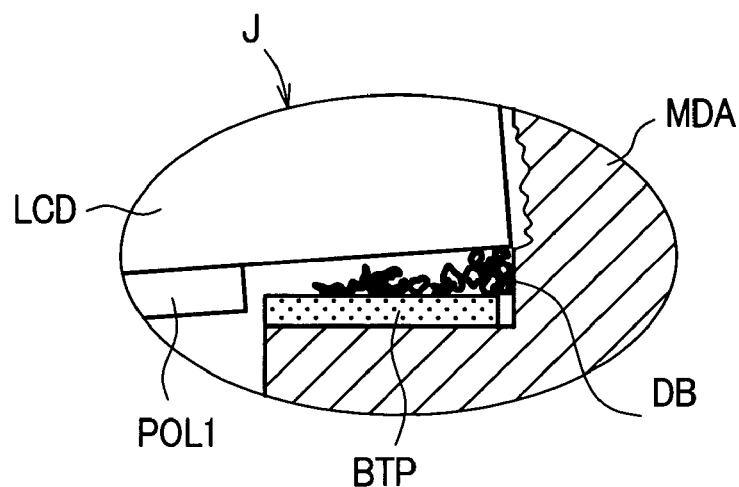
FIG. 10B is an enlarged view of a portion J shown in FIG. 10A.

FIG. 8 is a perspective view of an essential part of a display device according to an embodiment 4 similar to FIG. 1B. Further, FIG. 9 is a cross-sectional view taken along a line Y–Y' in FIG. 8. In this embodiment, a pair of guide projections GP are formed respectively on inner walls of two sides of a picture-frame-like portion MDA of a mold casing which face each other in the line X–X' direction in FIG. 1A.

The guide projections GP formed on the inner walls of the picture-frame-like portion MDA of the mold casing have an approximately semi-circular cross section and have the longitudinal direction thereof arranged parallel to the Y–Y' direction. However, a cross-sectional shape of the guide projections GP is not limited to such a shape and may be versatile shapes as explained in conjunction with the above-mentioned respective embodiments. Further, the guide projections GP are not always formed on the above-mentioned inner walls of two opposing sides and may be formed on the inner wall of only one side.

In this embodiment, in the vicinity of a lower end of the guide projection GP, a recess ALC which is indented in the thickness direction of the bottom portion MDB is formed and the lower end of the guide projection GP extends into the inside of the recess ALC. However, the lower end of the guide projection GP may be terminated at an open end of the recess ALC or above the recess ALC. Further, although the opening shape of the recess ALC is set to a rectangular shape, a circular shape, an elliptical shape, a polygonal shape, an irregular shape may be adopted as the opening shape of the recess ALC. The structure for housing a backlight and a liquid crystal display element in the mold casing of this embodiment and other constitutions are substantially equal to those of the above-mentioned respective embodiments.

According to the constitution described in this embodiment, in housing the liquid crystal display element LCD in the mold casing, all of or most of the produced shaved-off debris DB is accommodated in the recess ALC. Accordingly, no shaved-off debris DB or substantially no shaved-off debris DB is stacked on the double coated tape BTP. As a result, the liquid crystal display element LCD is firmly adhered to the double coated tape BTP and hence, the gap defined between the liquid crystal display element LCD and the backlight which is constituted of the light guide plate GLB and the optical sheet OPS becomes uniform in plane whereby the occurrence of the defective display such as the brightness irregularities can be prevented and the high-quality image display can be obtained.

Further, in the above-mentioned respective embodiments even when the double coated tape is not used, the floating of the liquid crystal display element from the mold casing can be prevented and hence, the distance between the backlight and the liquid crystal display element can be made uniform in plane whereby the occurrence of defective display such as the brightness irregularities can be prevented thus realizing the high-quality image display.

Here, it is needless to say that the present invention is not limited to the display device using the liquid crystal display element which has been explained in conjunction with the respective embodiments and is applicable to other display device which adopts the substrates harder than the constitutional material of the casing as the constitutional member, for example, a display device which adopts an organic light emitting display element.

What is claimed is:

1. A display device comprising a substrate type display element integrally inserted, housed and held in a frame-like casing made of a material softer than a material of substrates which constitute the display element, wherein
    the casing includes a picture-frame-like portion which forms an opening in a front surface side thereof for inserting the display element therein and surrounds a periphery of the display element, and a bottom portion which is integrally formed with the picture-frame-like portion at at least a portion of a back surface of the casing opposite to the front surface side,
    a guide projection which extends in the bottom-portion direction from the front surface side is formed on an inner wall of a side of the picture-frame-like portion which is brought into contact with an outer periphery of the substrate which constitutes the display element,
    the guide projection is shaped as a semi-circular column, and
    a bottom-portion-side end portion of the guide projection terminates so as to form a gap between the guide projection and the bottom-portion of the casing.

2. A display device according to claim 1, wherein the gap which is formed at the bottom-portion-side end portion of the guide projection is provided for accommodating a shaved-off debris which is shaved off due to the abrasion between an outer periphery of the substrate which constitutes the display element and the guide projection when the display element is inserted between the picture-frame-like portion and the bottom portion.

3. A display device according to claim 1, wherein the guide projections are formed on the inner walls of two opposing sides of the picture-game-like portion.

4. A display device according to claim 2, wherein the guide projections are formed on the inner walls of two opposing sides of the picture-frame-like portion.

5. A display device according to claim 1, wherein the display element is a liquid crystal display element which uses a glass plate as a substrate material and the mold casing is a molded product member made of a resin material.

6. A display device according to claim 2, wherein the display element is a liquid crystal display element which uses a glass plate as a substrate material and the mold casing is a molded product member made of a resin material.

7. A display device according to claim 3, wherein the display element is a liquid crystal display element which uses a glass plate as a substrate material and the mold casing is a molded product member made of a resin material.

8. A display device according to claim 4, wherein the display element is a liquid crystal display element which uses a glass plate as a substrate material and the mold casing is a molded product member made of a resin material.

9. A display device comprising a panel type display element integrally inserted, housed and held in a frame-like casing made of a material softer than a material of substrates which constitute the display element, wherein
    the casing includes a picture-frame-like portion which forms an opening in a front surface side thereof for inserting the display element therein and surrounds a periphery of the display element, and a bottom portion which is integrally formed with the picture-frame-like portion at at least a portion of a back surface of the casing opposite to the front surface side for inserting the display element,
    a guide projection which extends in the bottom-portion direction from the front surface side is formed on an inner wall of a side of the picture-frame-like portion which is brought into contact with an outer periphery of the substrate which constitutes the display element, and
    an opening which penetrates the casing and communicates with the outside of the casing is formed in the vicinity of a bottom-portion-side end portion of the guide projection.

10. A display device according to claim 9, wherein the guide projections are formed on the inner walls of two opposing sides of the picture-frame-like portion.

11. A display device according to claim 10, wherein the display element is a liquid crystal display element which uses a glass plate as said substrate material and the mold casing is a molded product member made of a resin material.

12. A display device according to claim 9, wherein the display element is a liquid crystal display element which uses a glass plate as said substrate material and the mold casing is a molded product member made of a resin material.

13. A display device comprising a panel type display element integrally inserted, housed and held in a frame-like casing made of a material softer than a material of substrates which constitute the display element, wherein
    the casing includes a picture-frame-like portion which forms an opening in a front surface side thereof for inserting the display element therein and surrounds a periphery of the display element, and a bottom portion which is integrally formed with the picture-frame-like portion at at least a portion of a back surface of the casing opposite to the front surface side for inserting the display element,
    a guide projection which extends in the bottom-portion direction from the front surface side is formed on an inner wall of a side of the picture-frame-like portion which is brought into contact with an outer periphery of the substrate which constitutes the display element, and
    a recess which extends toward the inside of the casing is formed in the vicinity of a bottom-portion-side end portion of the guide projection.

14. A display device according to claim 13, wherein the guide projections are formed on the inner walls of two opposing sides of the picture-frame-like portion.

15. A display device according to claim 14, wherein the display element is a liquid crystal display element which uses a glass plate as said substrate material and the mold casing is a molded product member made of a resin material.

16. A display device according to claim 13, wherein the display element is a liquid crystal display element which uses a glass plate as said substrate material and the mold casing is a molded product member made of a resin material.

* * * * *